(12) United States Patent
Inoue et al.

(10) Patent No.: US 11,930,306 B2
(45) Date of Patent: Mar. 12, 2024

(54) PROJECTION APPARATUS, PROJECTION METHOD, AND CONTROL PROGRAM

(71) Applicant: FUJIFILM Corporation, Tokyo (JP)

(72) Inventors: Kazuki Inoue, Saitama (JP); Tomonori Masuda, Saitama (JP); Akihiro Ishizuka, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/875,510

(22) Filed: Jul. 28, 2022

(65) Prior Publication Data

US 2022/0368870 A1  Nov. 17, 2022

Related U.S. Application Data

(63) Continuation of application No. PCT/JP2021/002340, filed on Jan. 22, 2021.

(30) Foreign Application Priority Data

Jan. 29, 2020 (JP) ................................. 2020-012987

(51) Int. Cl.
H04N 9/31 (2006.01)

(52) U.S. Cl.
CPC ......... *H04N 9/3185* (2013.01); *H04N 9/3188* (2013.01)

(58) Field of Classification Search
CPC .... G03B 21/00; G03B 21/006; G03B 21/008; G03B 21/28; G03B 21/142; G03B 21/145;

(Continued)

(56) References Cited

U.S. PATENT DOCUMENTS

2009/0225233 A1   9/2009  Hirata et al.
2010/0134764 A1*  6/2010  Ozawa .................. G03B 31/00
                                              353/15

(Continued)

FOREIGN PATENT DOCUMENTS

CN    102455575 A    5/2012
CN    109307973 A    2/2019

(Continued)

OTHER PUBLICATIONS

International Preliminary Report on Patentability and Written Opinion of the International Searching Authority for International Application No. PCT/JP2021/002340, dated Aug. 11, 2022, with an English translation.

(Continued)

*Primary Examiner* — Sultan Chowdhury
(74) *Attorney, Agent, or Firm* — Birch, Stewart, Kolasch & Birch, LLP

(57) ABSTRACT

A projection apparatus includes a projection portion that performs irradiation with projection light, and a moving mechanism that moves a projection range of the projection light. In a state where the projection range is maintained, the projection apparatus displays an image showing a movement destination of the projection range in response to a first operation by the projection portion. The projection apparatus moves the projection range to the movement destination by the moving mechanism.

9 Claims, 14 Drawing Sheets

(58) Field of Classification Search
CPC ...... G03B 21/147; H04N 9/312; H04N 9/315; H04N 9/317; H04N 9/3141; H04N 9/3152; H04N 9/3185; H04N 9/3187; G09G 5/00; G09G 5/36
See application file for complete search history.

(56) References Cited

U.S. PATENT DOCUMENTS

| | | |
|---|---|---|
| 2010/0141907 A1 | 6/2010 | Hirata et al. |
| 2011/0019166 A1 | 1/2011 | Ishida |
| 2011/0122328 A1 | 5/2011 | Hirata et al. |
| 2014/0306890 A1 | 10/2014 | Ozawa |
| 2018/0033123 A1* | 2/2018 | Narimatsu ............. G03B 21/26 |
| 2019/0037186 A1 | 1/2019 | Yoshimura |
| 2019/0155128 A1 | 5/2019 | Shimizu |
| 2019/0253677 A1 | 8/2019 | Yuan |
| 2020/0145629 A1* | 5/2020 | Matsugano .......... G03B 21/142 |
| 2020/0267356 A1* | 8/2020 | Kubota ................ G03B 21/142 |

FOREIGN PATENT DOCUMENTS

| | | |
|---|---|---|
| JP | 2006-313979 A | 11/2006 |
| JP | 2009-216883 A | 9/2009 |
| JP | 2011-27799 A | 2/2011 |
| JP | 2012-189833 A | 10/2012 |
| JP | 2013-37082 A | 2/2013 |
| JP | 2013-250317 A | 12/2013 |
| JP | 2017-227803 A | 12/2017 |
| WO | WO2018/016309 A1 | 1/2018 |

OTHER PUBLICATIONS

International Search Report for International Application No. PCT/JP2021/002340, dated Mar. 30, 2021, with an English translation.
Japanese Office Action for corresponding Japanese Application No. 2021-574001, dated May 23, 2023, with English translation.
Japanese Notice of Reasons for Refusal for Japanese Application No. 2021-574001, dated Jul. 4, 2023, with an English translation.
Chinese Office Action and Search Report for corresponding Chinese Application No. 202180011697.0, dated Sep. 14, 2023, with English translation.

* cited by examiner

PROJECTION APPARATUS, PROJECTION METHOD, AND CONTROL PROGRAM

CROSS REFERENCE TO RELATED APPLICATION

This is a continuation of International Application No. PCT/JP2021/002340 filed on Jan. 22, 2021, and claims priority from Japanese Patent Application No. 2020-012987 filed on Jan. 29, 2020, the entire disclosures of which are incorporated herein by reference.

BACKGROUND OF THE INVENTION

1. Field of the Invention

The present invention relates to a projection apparatus, a projection method, and a computer readable medium storing a control program.

2. Description of the Related Art

In the related art, projection apparatuses that display an image by projecting the image to a projection object such as a large screen have been known. In addition, JP2011-27799A discloses a projection apparatus that performs lens shifting of optically moving a position of a projection image and digital shifting of electrically moving the position of the projection image in a switched manner. In addition, JP2013-250317A discloses a projection apparatus that controls driving resolution of a projection lens in accordance with a projection environment.

SUMMARY OF THE INVENTION

One embodiment according to the disclosed technology is conceived in view of the above matter and provides a projection apparatus, a projection method, and a computer readable medium storing a control program that can efficiently perform registration of a projection range of projection light of irradiation performed by the projection apparatus.

A projection apparatus according to an aspect of the present invention comprises a projection portion that performs irradiation with projection light, a moving mechanism that moves a projection range of the projection light, and a processor, in which the processor is configured to, in response to a first operation, display an image showing a movement destination of the projection range by the projection portion in a state where the projection range is maintained, and execute a control of moving the projection range to the movement destination by the moving mechanism.

A projection method according to another aspect of the present invention is a projection method by a projection apparatus including a projection portion that performs irradiation with projection light, and a moving mechanism that moves a projection range of the projection light, the projection method comprising displaying, in response to a first operation, an image showing a movement destination of the projection range in response to a first operation by the projection portion in a state where the projection range is maintained, and moving the projection range to the movement destination by the moving mechanism.

A non-transitory computer readable medium storing a control program according to still another aspect of the present invention is a non-transitory computer readable medium storing a control program of a projection apparatus including a projection portion that performs irradiation with projection light, and a moving mechanism that moves a projection range of the projection light, the control program causing a computer to execute a process comprising displaying, in response to a first operation, an image showing a movement destination of the projection range by the projection portion in a state where the projection range is maintained, and executing a control of moving the projection range to the movement destination by the moving mechanism.

According to the present invention, a projection apparatus, a projection method, and a computer readable medium storing a control program that can efficiently perform registration of a projection range of projection light of irradiation performed by the projection apparatus can be provided.

DESCRIPTION OF THE PREFERRED EMBODIMENTS

Hereinafter, an embodiment of the present invention will be described with reference to the drawings.

Figure 1:
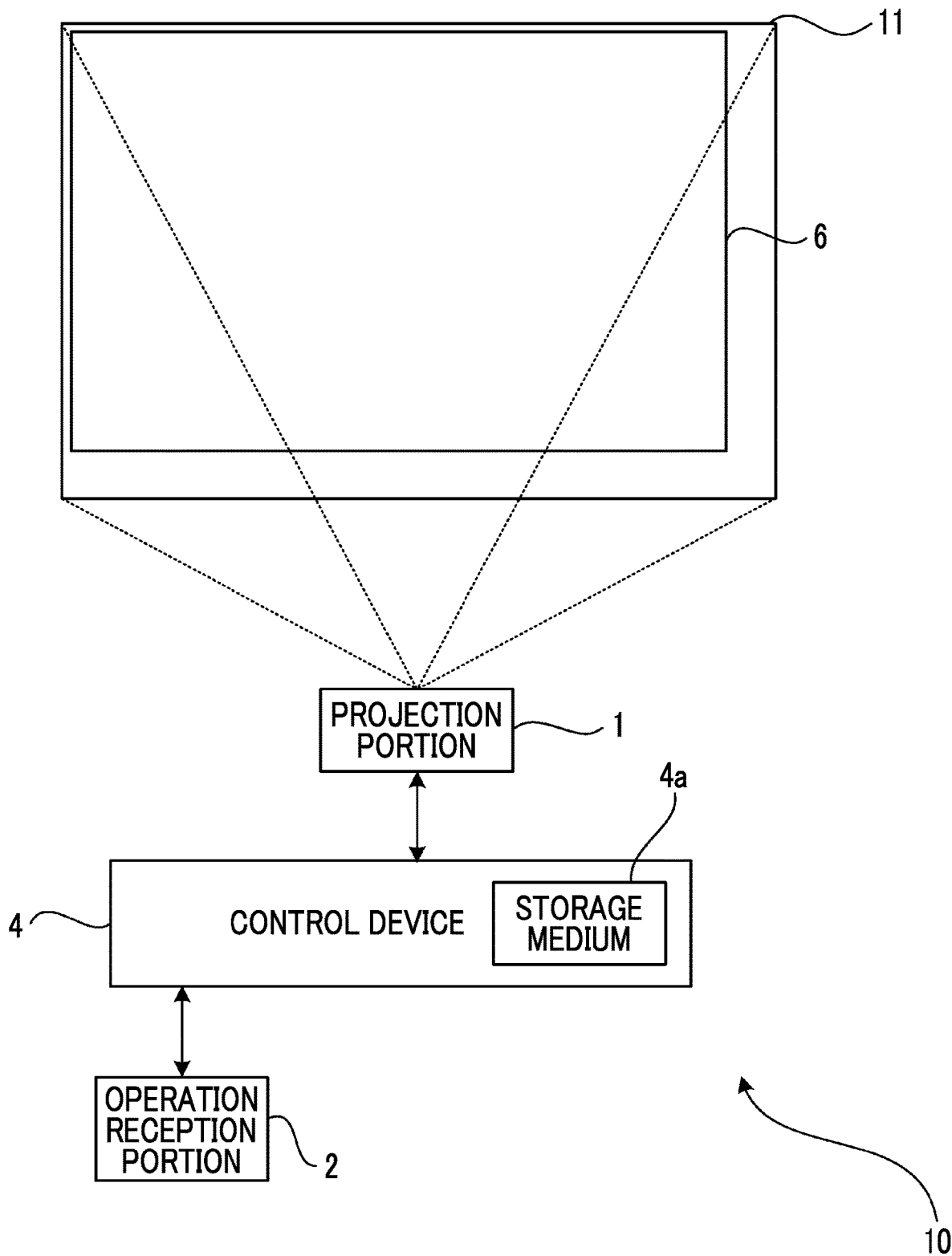
FIG. 1 is a schematic diagram illustrating a schematic configuration of a projection apparatus 10 that is an embodiment of a projection apparatus according to an embodiment of the present invention.

Schematic Configuration of Projection Apparatus 10 That Is Embodiment of Projection Apparatus According to Present Invention FIG. 1 is a schematic diagram illustrating a schematic configuration of a projection apparatus 10 that is an embodiment of a projection apparatus according to the embodiment of the present invention.

The projection apparatus 10 comprises a projection portion 1, a control device 4, a screen 6, and an operation reception portion 2. The projection portion 1 is configured with, for example, a liquid crystal projector or a projector using liquid crystal on silicon (LCOS). Hereinafter, the projection portion 1 will be described as a liquid crystal projector.

The control device 4 is a device including a control portion configured with various processors, a communication interface (not illustrated) for communicating with each portion, and a storage medium 4a such as a hard disk, a solid state drive (SSD), or a read only memory (ROM) and generally controls the projection portion 1.

Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction (user instruction) from a user by receiving various operations from the user. The operation reception portion 2 may be a button, a key, a joystick, or the like provided in the control device 4 or a reception portion or the like that receives a signal from a remote controller for remotely operating the control device 4.

The screen 6 is a projection object having a projection surface on which a projection image is displayed by the projection portion 1. In the example illustrated in FIG. 1, the projection surface of the screen 6 is rectangular. It is assumed that upper, lower, left, and right sides of the screen 6 in FIG. 1 are upper, lower, left, and right sides of the actual screen 6.

The projection range 11 is a range irradiated with projection light by the projection portion 1. In the example illustrated in FIG. 1, the projection range 11 is rectangular. In the state illustrated in FIG. 1, the projection range 11 is different from the screen 6 in position and size. Here, a case of registering the projection range 11 with respect to the screen 6 will be described.

Internal Configuration of Projection Portion 1 Illustrated in FIG. 1

Figure 2:
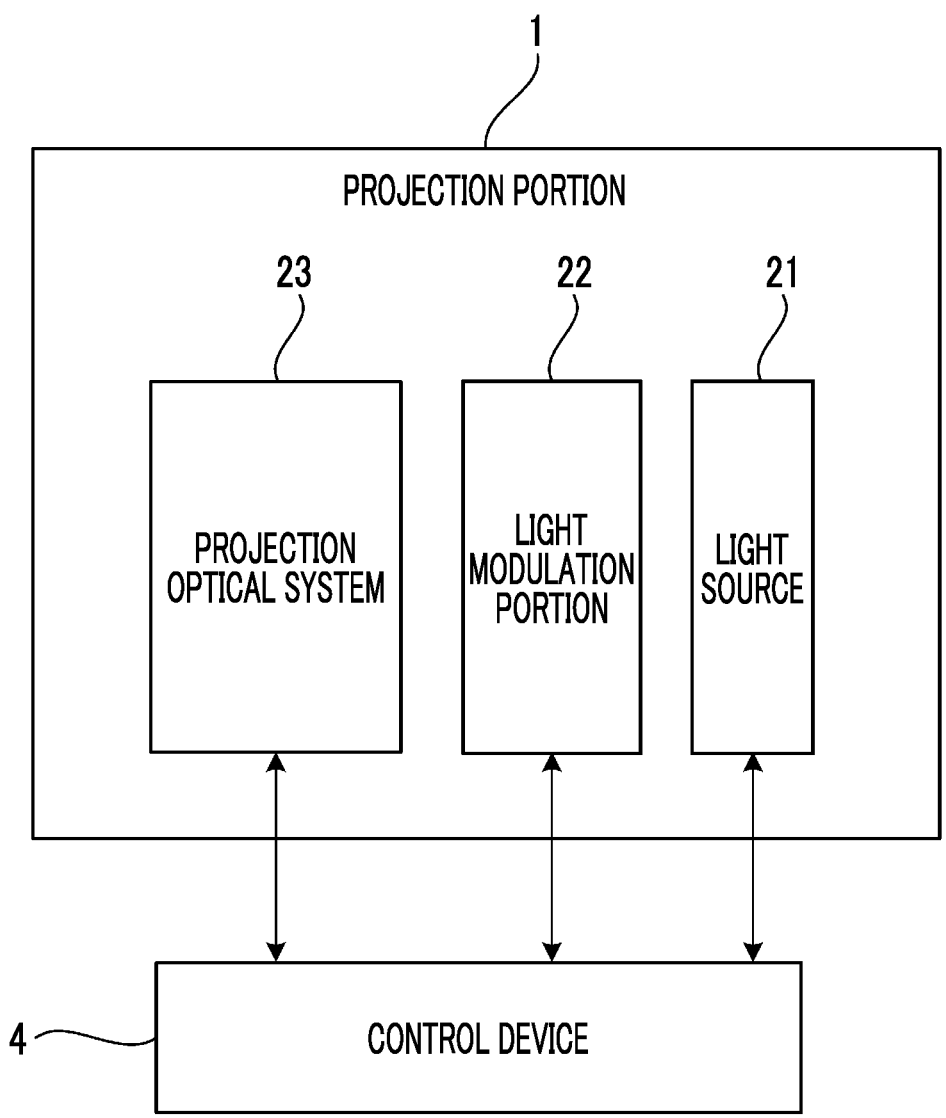
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, and a projection optical system 23.

The light source 21 includes a light emitting element such as a laser or a light emitting diode (LED) and emits, for example, white light.

The light modulation portion 22 is configured with three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is configured with, for example, a relay optical system. The light that has passed through the projection optical system 23 is projected to the screen 6.

The control device 4 projects an image based on display data to the screen 6 by controlling the light source 21 and the light modulation portion 22 based on the display data. The display data is configured with three constituents of red display data, blue display data, and green display data.

In addition, the control device 4 performs enlargement or reduction of the projection range 11 (refer to FIG. 1) of the projection portion 1 by changing the projection optical system 23 based on an operation received by the operation reception portion 2 from the user. In addition, the control device 4 may move the projection range 11 of the projection portion 1 by changing the projection optical system 23 based on the operation received by the operation reception portion 2 from the user.

In addition, the projection apparatus 10 comprises an adjustment portion that mechanically or optically adjusts a position of the projection range 11. For example, this adjustment portion is implemented by a shift mechanism or an imaging direction changing mechanism.

The shift mechanism is, for example, a shift mechanism (for example, refer to FIG. 3 and FIG. 4) that performs mechanical shifting of moving the projection optical system 23 in a direction perpendicular to an optical axis, or a shift mechanism that performs optical shifting of moving the light modulation portion 22 in the direction perpendicular to the optical axis instead of moving the projection optical system 23. In addition, the shift mechanism may perform the mechanical shifting and the optical shifting in combination. The shift mechanism is an example of a moving mechanism that moves the projection range 11.

Shifting of the projection range 11 using the shift mechanism will be referred to as optical system shifting. On the other hand, pseudo shifting of the projection range 11 by adjusting a range through which the light is transmitted in the light modulation portion 22 without shifting the projection range 11 will be referred to as electronic shifting.

Figure 3:
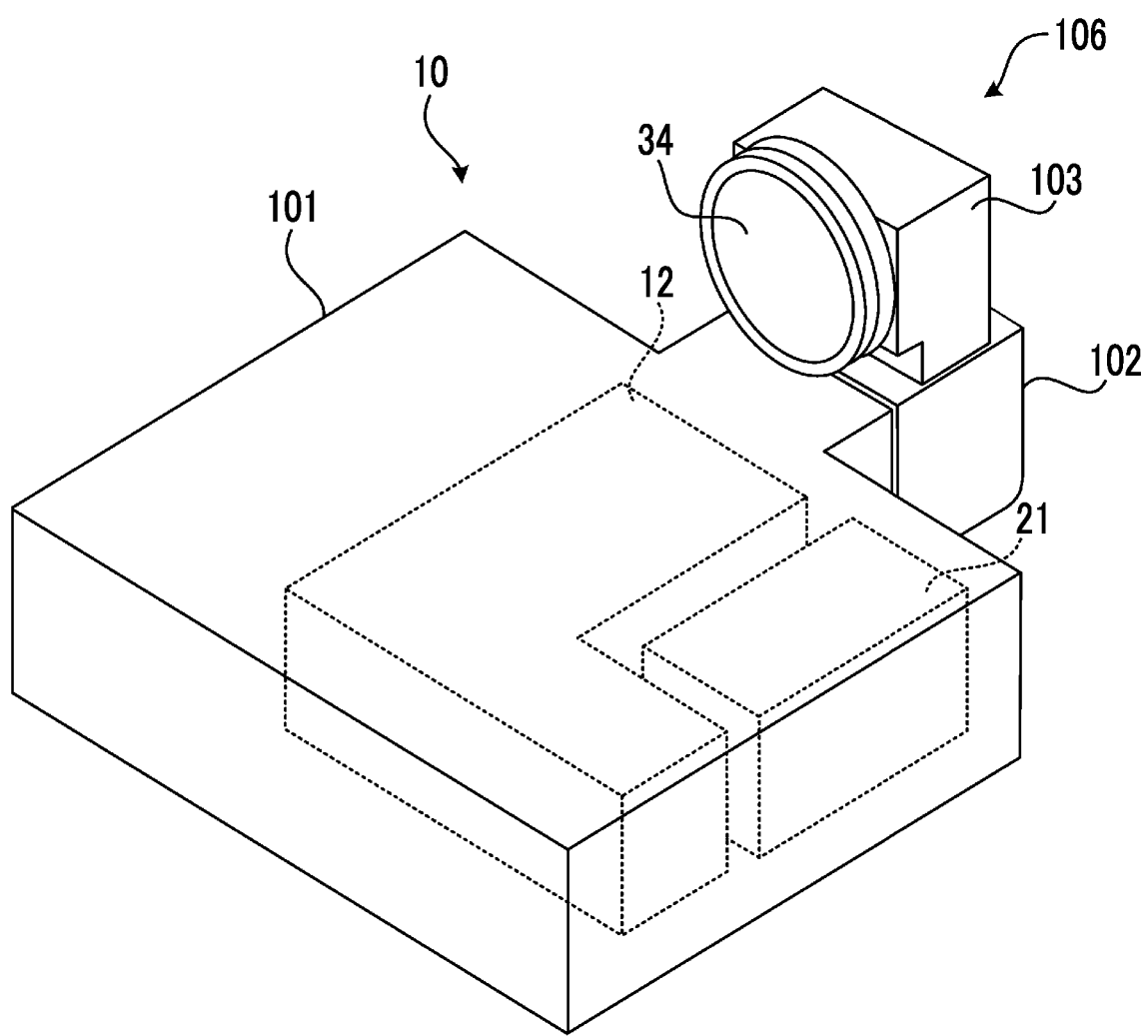
FIG. 3 is a schematic diagram illustrating an exterior configuration of the projection apparatus 10.
Figure 4:
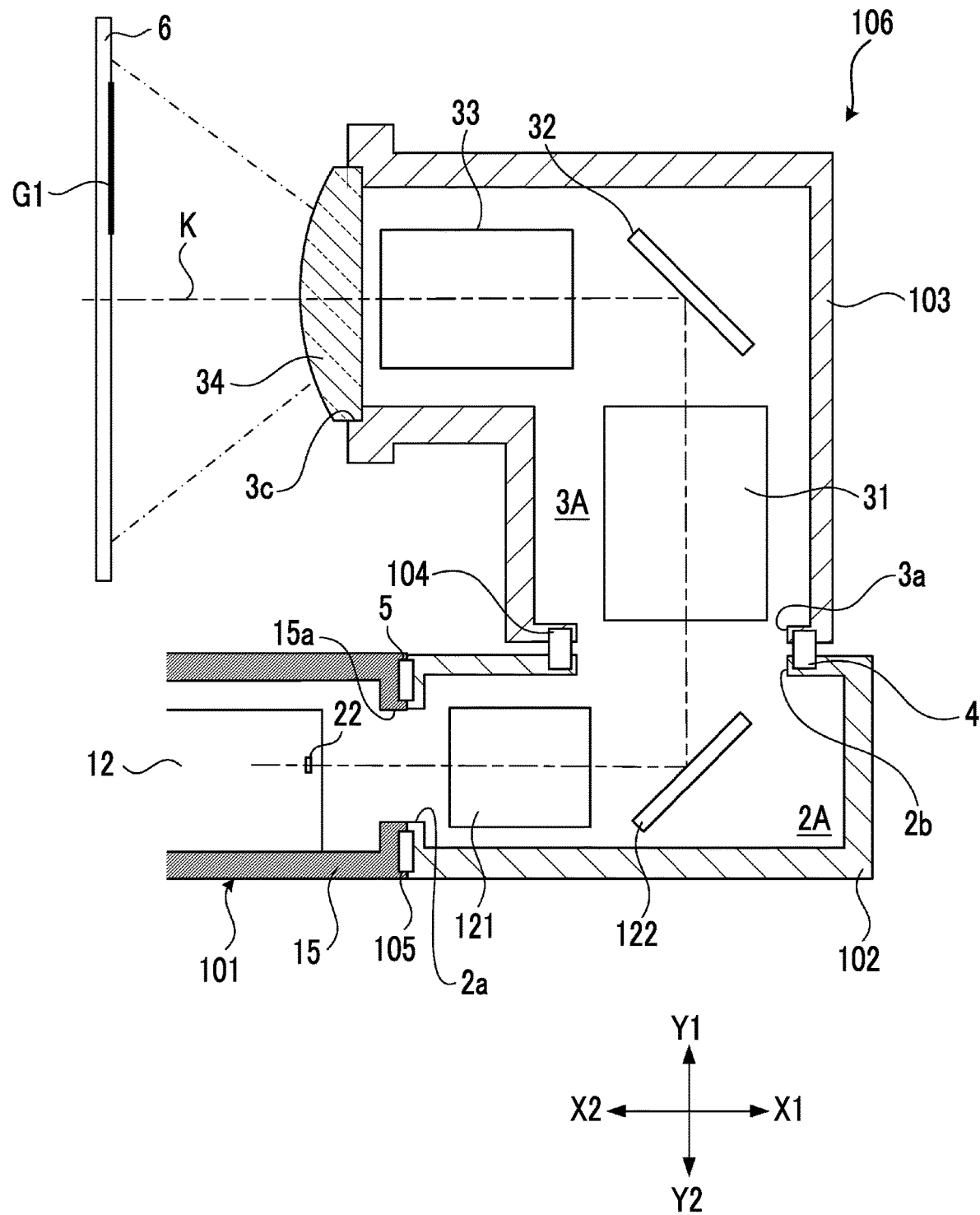
FIG. 4 is a schematic cross-sectional view of an optical unit 106 of the projection apparatus 10 illustrated in FIG. 3.

The imaging direction changing mechanism is a mechanism that can change a projection direction of the projection portion 1 by changing a direction of the projection portion 1 by mechanical rotation (for example, refer to FIG. 3 and FIG. 4).

Mechanical Configuration of Projection Apparatus 10

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2, the control device 4, and the light source 21 and the light modulation portion 22 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

In the example illustrated in FIG. 2, the light emitted from the light source 21 is incident on the light modulation portion 22.

As illustrated in FIG. 4, the image formed by the light spatially modulated by the light modulation unit 12 is incident on the optical unit 106 through the opening 15a of the housing 15 and is projected to the screen 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a shift mechanism 105, and an imaging direction changing mechanism 104.

The first member 102 is a member having, for example, a rectangular cross-sectional exterior, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is arranged such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the screen 6.

The imaging direction changing mechanism 104 is a rotation mechanism that rotatably connects the second member 103 to the first member 102. By the imaging direction changing mechanism 104, the second member 103 is configured to be rotatable about a rotation axis (specifically, the optical axis K) that extends in the direction Y. The imaging direction changing mechanism 104 is not limited to an arrangement position illustrated in FIG. 4 as long as the imaging direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 by the shift mechanism 105 from the state illustrated in FIG. 4, a relative position between a center of the image (in other words, a center of a display surface) formed by the light modulation portion 22 and the optical axis K changes, and the image G1 projected to the screen 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the screen 6 can be moved in the direction Y2.

Adjustment Processing of Projection Range 11 by Projection Apparatus 10

Figure 5:
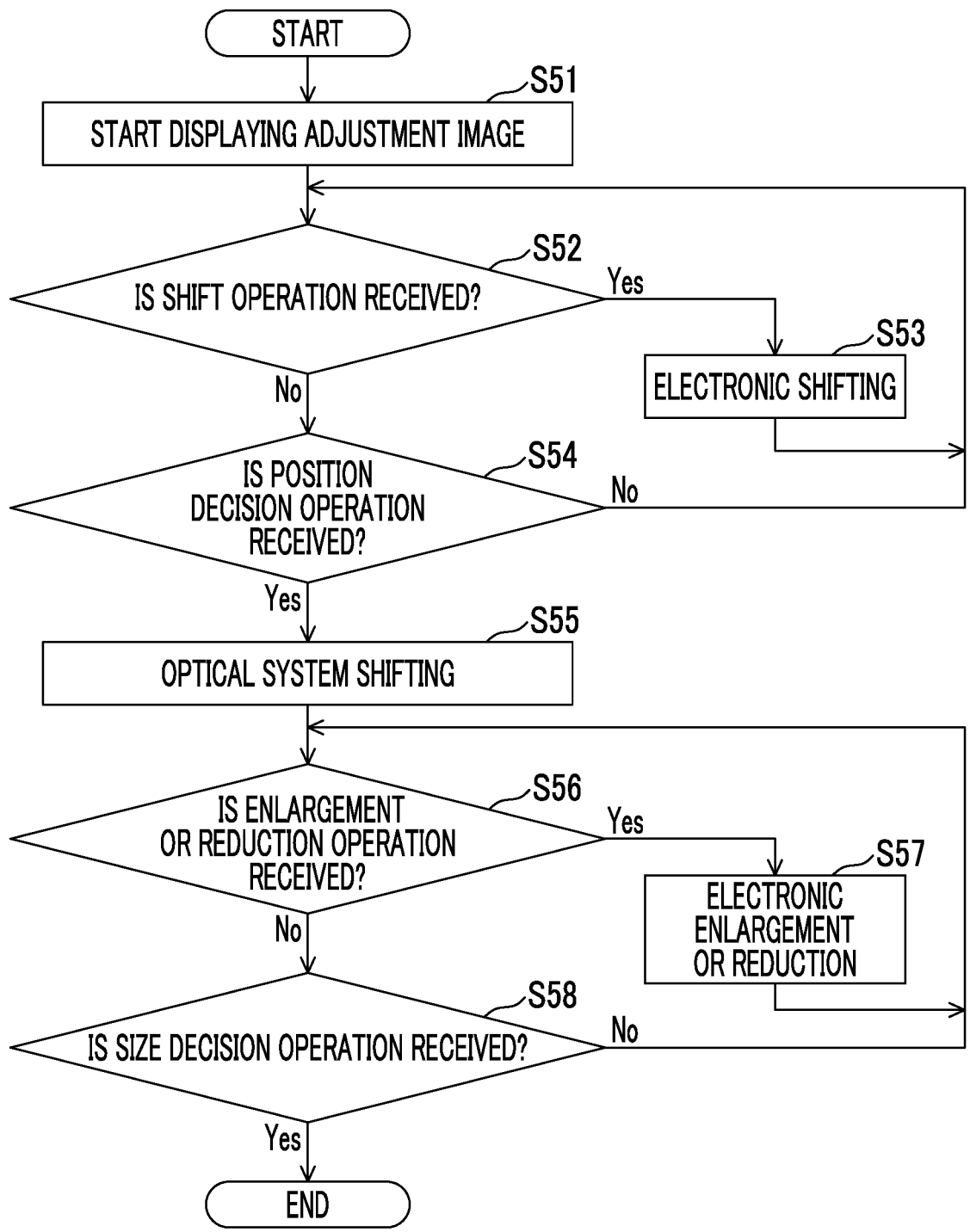
FIG. 5 is a flowchart illustrating an example of adjustment processing of a projection range 11 by the projection apparatus 10.

FIG. 5 is a flowchart illustrating an example of adjustment processing of the projection range 11 by the projection apparatus 10.

First, the projection apparatus 10 starts displaying an adjustment image in the projection range 11 by performing projection by the projection portion 1 (step S51). The adjustment image is an image showing the projection range 11 after the optical system shifting that is temporarily decided at the current point in time, in a pseudo manner (for example, refer to FIG. 6).

For example, the projection range 11 after the optical system shifting that is temporarily decided at the point in time of step S51 is the same range as the projection range 11 at the current point in time (that is, the projection range 11 for which an optical system shifting amount is 0) but is not limited thereto and can be set to any range.

Next, the projection apparatus 10 determines whether or not a shift operation is received from the user through the operation reception portion 2 (step S52). The shift operation is an operation of providing an instruction for a direction and an amount of the optical system shifting of the projection apparatus 10 and is, for example, an operation of tilting the joystick or a press on a cursor key. The shift operation is an example of a first operation according to the embodiment of the present invention.

In step S52, in a case where the shift operation is received (step S52: Yes), the projection apparatus 10 performs the electronic shifting in response to the received shift operation (step S53) and returns to step S52. The electronic shifting is changing of the projection range 11 after the optical system shifting shown by the adjustment image displayed in the projection range 11 while maintaining the projection range 11. A specific example of the electronic shifting will be described later (for example, refer to FIG. 6).

In step S52, in a case where the shift operation is not received (step S52: No), the projection apparatus 10 determines whether or not a position decision operation is received from the user through the operation reception portion 2 (step S54). The position decision operation is an operation of providing an instruction to perform the optical system shifting of the projection range 11 in accordance with the adjustment image displayed at the current point in time and is, for example, a press on a decision key. The position decision operation is an example of a second operation according to the embodiment of the present invention.

In step S54, in a case where the position decision operation is not received (step S54: No), the projection apparatus 10 returns to step S52. In a case where the position decision operation is received (step S54: Yes), the projection apparatus 10 performs the optical system shifting of moving the projection range 11 in accordance with the adjustment image displayed at the current point in time (step S55). As described above, the optical system shifting is the shifting of the projection range 11 using the shift mechanism. A specific example of the optical system shifting will be described later (for example, refer to FIG. 7).

Next, the projection apparatus 10 determines whether or not an enlargement or reduction operation is received from the user through the operation reception portion 2 (step S56). The enlargement or reduction operation is an operation of providing an instruction to enlarge or reduce a display region in which the projection image is displayed in the projection range 11, by enlarging or reducing the range through which the light is transmitted in the light modulation portion 22, and is, for example, an operation of tilting the joystick or a press on the cursor key. The enlargement or reduction operation is an example of a third operation according to the embodiment of the present invention.

In step S56, in a case where the enlargement or reduction operation is received (step S56: Yes), the projection apparatus 10 performs electronic enlargement or reduction of the display region of the projection range 11 in response to the received enlargement or reduction operation (step S57) and returns to step S56.

In step S56, in a case where the enlargement or reduction operation is not received (step S56: No), the projection apparatus 10 determines whether or not a size decision operation is received from the user through the operation reception portion 2 (step S58). The size decision operation is an operation of providing an instruction to decide the display region of the projection range 11 as the display region at the current point in time and is, for example, an operation such as a press on a decision button. In a case where the size decision operation is not received (step S58: No), the projection apparatus 10 returns to step S56.

In step S58, in a case where the size decision operation is received (step S58: Yes), the projection apparatus 10 finishes the series of adjustment processing.

Figure 6:
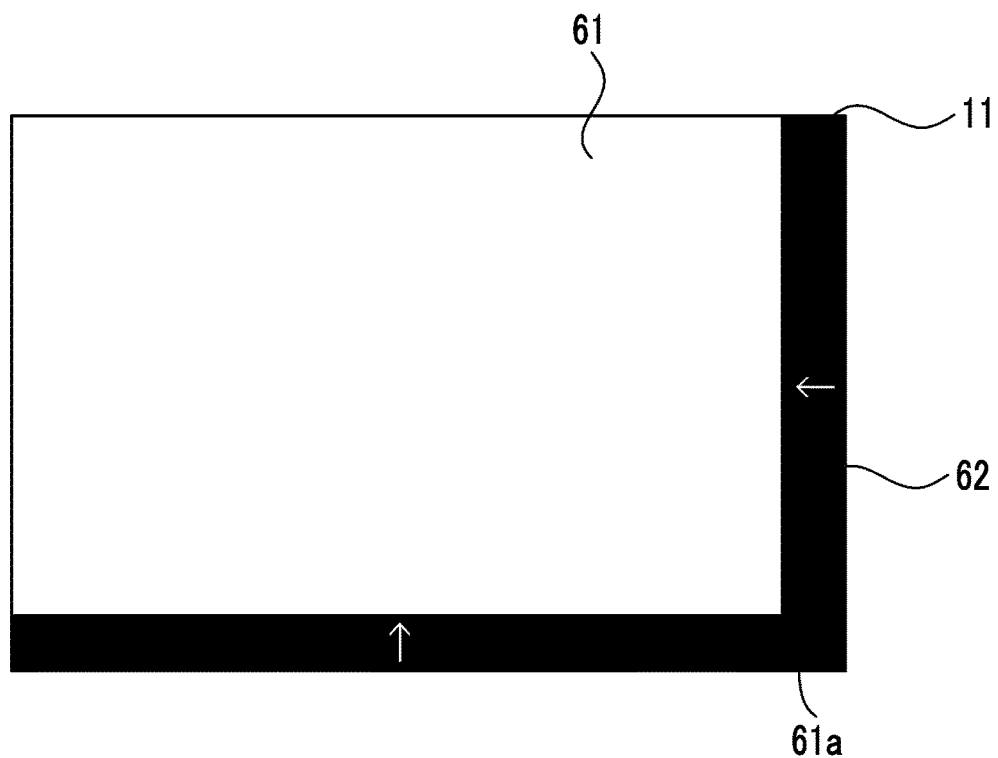
FIG. 6 is a diagram illustrating an example of electronic shifting by the projection apparatus 10 in response to a shift operation from a user.

Electronic Shifting by Projection Apparatus 10 in Response to Shift Operation from User FIG. 6 is a diagram illustrating an example of the electronic shifting by the projection apparatus 10 in response to the shift operation from the user. In step S51 in FIG. 5, the projection apparatus 10 starts displaying an image consisting of an adjustment image 61 and a blank image 62.

The adjustment image 61 shows the projection range 11 after the optical system shifting. However, since the projection range 11 after the optical system shifting includes a part that extends from the projection range 11 at the current point in time, the adjustment image 61 shows a part of the projection range 11 after the optical system shifting that is included in the projection range 11 at the current point in time. For example, the adjustment image 61 may be an image of white or the like as a whole, any content image, or an image that displays guidance for an operation or the like to the user. The adjustment image 61 is an example of an image that shows a movement destination of the projection range 11 corresponding to the shift operation.

The blank image 62 shows a range of the projection range 11 at the current point in time excluding the adjustment image 61, that is, a range that is not included in the projection range 11 after the optical shifting. For example, the blank image 62 is an image of a black color as a whole. For example, the blank image 62 may include an image of an arrow or the like that indicates a movement direction of the projection range 11 as illustrated in FIG. 6.

For example, at the point in time of step S51 in FIG. 5, it is assumed that a shift amount of the projection range 11 is set to 0. In this case, while illustration is not provided, a state where only the adjustment image 61 is displayed in the projection range 11 is set.

Then, in a case where the user performs the shift operation of providing an instruction to move the projection range 11 in an upper left direction, the adjustment image is set to a state illustrated in FIG. 6 by the electronic shifting in step S53 in FIG. 5. Specifically, the projection apparatus 10 reduces the adjustment image 61 and additionally displays the blank image 62. Accordingly, a lower right corner 61a of the adjustment image 61 changes to an upper left position from a lower right corner of the projection range 11.

Figure 7:
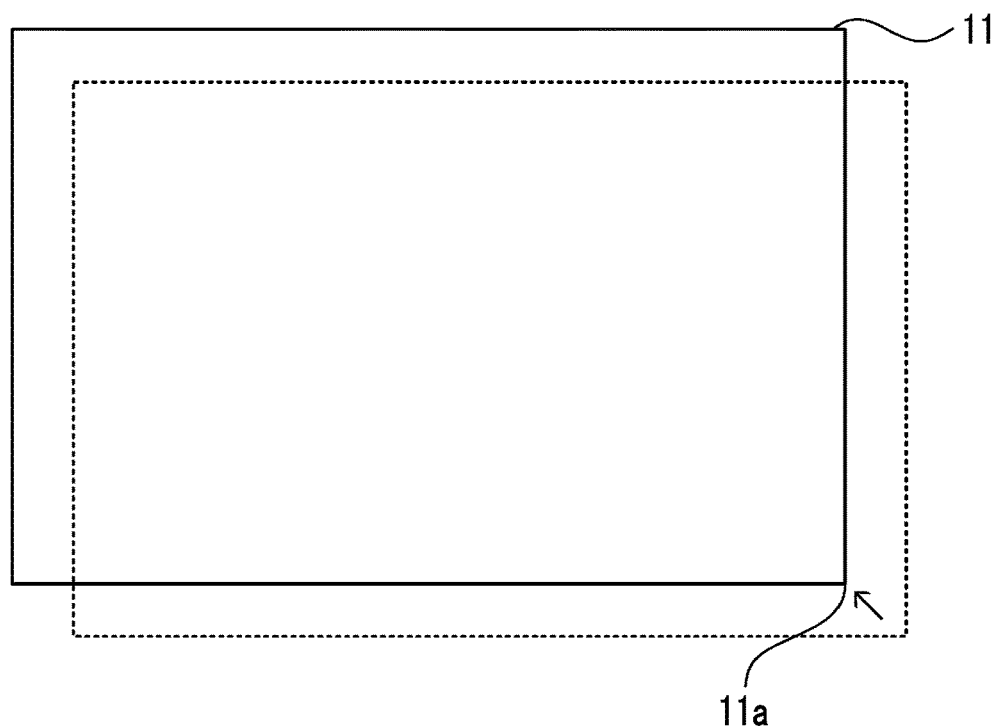
FIG. 7 is a diagram illustrating an example of optical system shifting by the projection apparatus 10 in accordance with a position decision operation from the user.

Optical System Shifting by Projection Apparatus 10 in Response to Position Decision Operation from User FIG. 7 is a diagram illustrating an example of the optical system shifting by the projection apparatus 10 in response to the position decision operation from the user. In a case where the user performs the position decision operation in the state illustrated in FIG. 6, for example, the projection apparatus 10 moves the projection range 11 as illustrated in FIG. 7 by the optical system shifting in step S55 in FIG. 5.

Specifically, the projection apparatus 10 moves the projection range 11 in the upper left direction by the optical system shifting such that a lower right corner 11a of the projection range 11 matches a position of the lower right corner 61a of the adjustment image 61 illustrated in FIG. 6. Accordingly, the projection range 11 can be moved to a position intended by the user.

At this point, in a case where the optical system shifting is performed while the adjustment image illustrated in FIG. 6 is displayed, the user may feel weird. Thus, the projection apparatus 10 may not change the position of the lower right corner 61a of the adjustment image 61 by performing the electronic shifting so that the blank image 62 is not narrowed in accordance with the optical system shifting. Accordingly, the projection range 11 can be moved without causing the user to feel weird. Alternatively, the projection apparatus 10 may not display the adjustment image before performing the optical system shifting.

As described using FIG. 6 and FIG. 7, the projection apparatus 10 first performs the electronic shifting by displaying the adjustment image 61 showing the projection range 11 corresponding to the shift operation in a state where the projection range 11 is maintained, and moves the projection range 11 in accordance with the adjustment image 61 by the optical system shifting in response to the position decision operation received after the shift operation.

Accordingly, the user can decide a region of the projection range 11 after the optical system shifting by repeating the shift operation while viewing the adjustment image 61. The user can move the projection range 11 to the decided region by performing the position decision operation after deciding the region of the projection range 11 after the optical system shifting by the shift operation.

Thus, the registration of the projection range 11 can be efficiently performed. For example, in a stage of performing the shift operation, the optical system shifting is not performed. Thus, a result of the shift operation is reflected on the adjustment image 61 without a delay. In addition, the number of times of driving of the optical system shifting is decreased. Thus, wear and power consumption of a driving system of the optical system shifting can be suppressed. In addition, there is no driving sound or the like of the optical system shifting accompanied by the repeated shift operation. Thus, a noise in the registration of the projection range 11 can be suppressed.

In addition, for example, a margin for the electronic shifting does not need to be secured within the projection range 11 compared to a configuration in which the projection image is shifted by preferentially performing the electronic shifting, and shifting of the projection image to a position that cannot be handled with only the electronic shifting is performed by lens shifting. Thus, projection that sufficiently utilizes the projection range can be performed.

Figure 8:
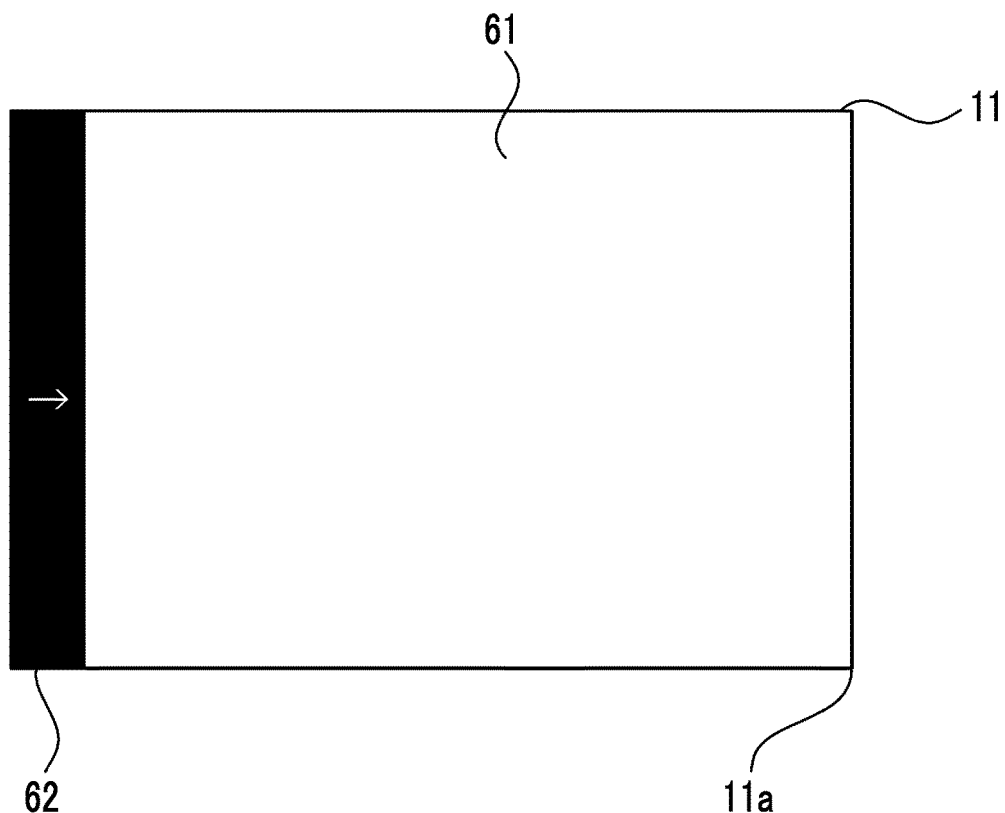
FIG. 8 is a diagram illustrating an example of electronic enlargement or reduction by the projection apparatus 10 in response to an enlargement or reduction operation from the user.

Electronic Enlargement or Reduction by Projection Apparatus 10 in Response to Enlargement or Reduction Operation from User FIG. 8 is a diagram illustrating an example of the electronic enlargement or reduction by the projection apparatus 10 in response to the enlargement or reduction operation from the user. In a case where the user performs the enlargement or reduction operation in the state illustrated in FIG. 7, for example, the projection apparatus 10 changes a size of the adjustment image 61 as illustrated in FIG. 8 by the electronic enlargement or reduction in step S57 in FIG. 5.

In the example illustrated in FIG. 8, it is assumed that the user performs the enlargement or reduction operation of providing an instruction to reduce a width of the display region of the projection range 11. Here, the optical system shifting described using FIG. 7 moves the projection range 11 in the upper left direction and is performed in a state where the lower right corner 61*a* of the adjustment image 61 showing the lower right corner 11*a* of the projection range 11 is displayed. Thus, it can be determined that a position of the lower right corner 11*a* of the projection range 11 at the current point in time is a position intended by the user.

Thus, the projection apparatus 10 reduces a width of the adjustment image 61 by performing the electronic shifting such that a left end part of the projection range 11 not including the lower right corner 11*a* is not projected (brightness is set to near 0). In the example illustrated in FIG. 8, the projection apparatus 10 displays a blank image 62 instead of a left end part of the adjustment image 61.

Similarly, while illustration is not provided, it is assumed that the user performs the enlargement or reduction operation of providing an instruction to reduce a height of the display region of the projection range 11. In this case, the projection apparatus 10 reduces a height of the adjustment image 61 by performing the electronic shifting such that an upper end part of the projection range 11 not including the lower right corner 11*a* is not projected (brightness is set to near 0). Specifically, the projection apparatus 10 displays the blank image 62 instead of an upper end part of the adjustment image 61.

After the adjustment processing illustrated in FIG. 5 is finished, in an operation stage of projecting a content image, the projection apparatus 10 projects the content image to a region of the projection range 11 in which the adjustment image 61 is displayed, and does not project the content image to the remaining region of the projection range 11 (for example, sets brightness to 0). Accordingly, the content image can be displayed within a range intended by the user.

Highlighted Display in Electronic Shifting by Projection Apparatus 10

Figure 9:
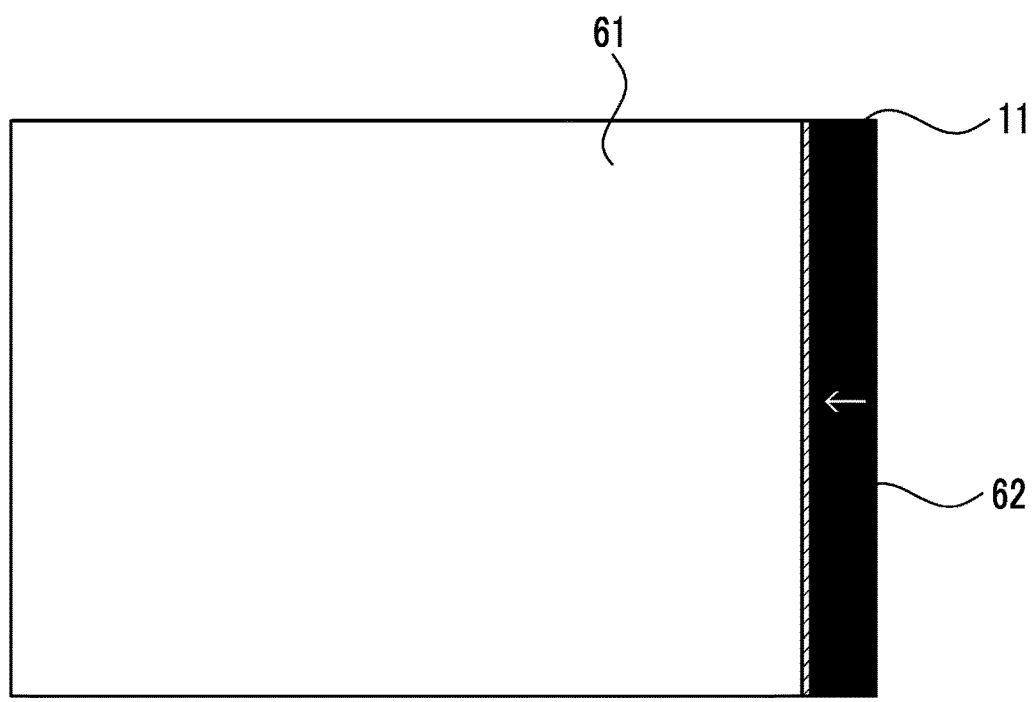
FIG. 9 is a diagram (Part 1) illustrating an example of highlighted display in the electronic shifting by the projection apparatus 10.
Figure 10:
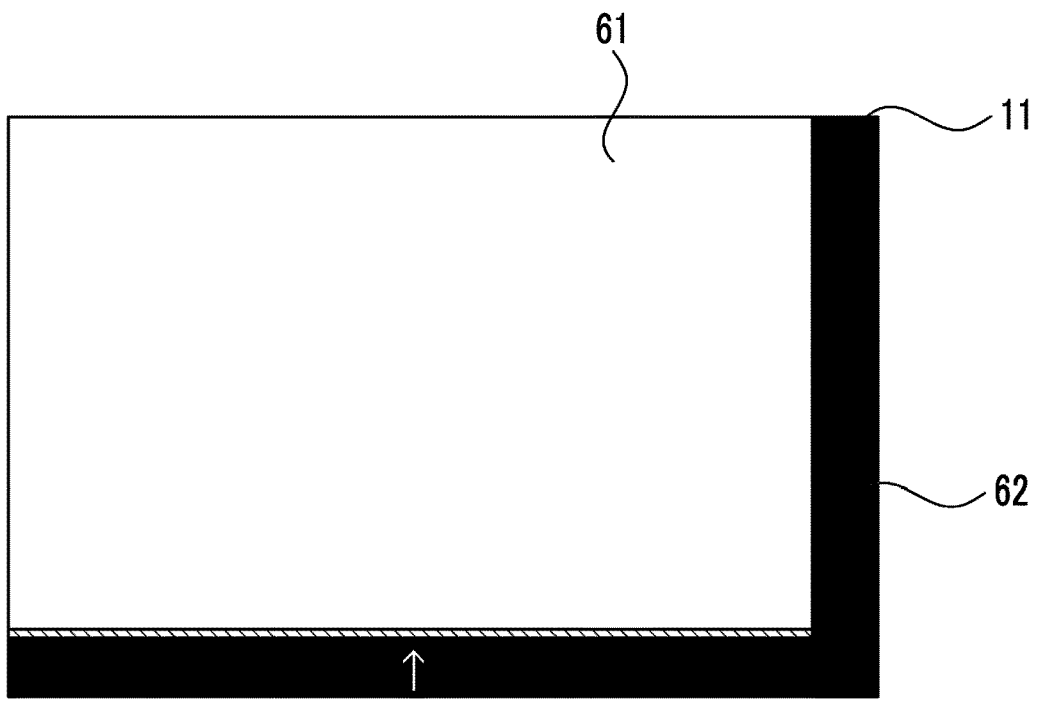
FIG. 10 is a diagram (Part 2) illustrating an example of the highlighted display in the electronic shifting by the projection apparatus 10.

FIG. 9 and FIG. 10 are diagrams illustrating an example of highlighted display in the electronic shifting by the projection apparatus 10. In performing the electronic shifting illustrated in FIG. 6, for example, the projection apparatus 10 separately receives the shift operation of providing an instruction to move the projection range 11 leftward and rightward and the shift operation of providing an instruction to move the projection range 11 upward and downward.

In this case, in a case where the shift operation of providing the instruction to move the projection range 11 leftward and rightward is received, the projection apparatus 10 may perform highlighted display of a right end part of the adjustment image 61 of which a display position changes in response to the shift operation in the adjustment image 61 as illustrated in FIG. 9.

Similarly, in a case where the shift operation of providing the instruction to move the projection range 11 upward and downward is received, the projection apparatus 10 may perform the highlighted display of a lower end part of the adjustment image 61 of which a display position changes in response to the shift operation in the adjustment image 61 as illustrated in FIG. 10. In FIG. 10, a state where the shift operation of providing the instruction to move the projection range 11 upward and downward is received after the shift operation of providing the instruction to move the projection range 11 leftward is received is illustrated.

For example, the highlighted display of the end part of the adjustment image 61 can be performed by setting a color or the like of the end part of the adjustment image 61 to be different from the other part of the adjustment image 61 or flashing the end part of the adjustment image 61 on and off. The highlighted display of the end part of the adjustment image 61 is not limited thereto and may be display that enables the user to recognize the end part of the adjustment image 61 separately from the other part.

Figure 11:
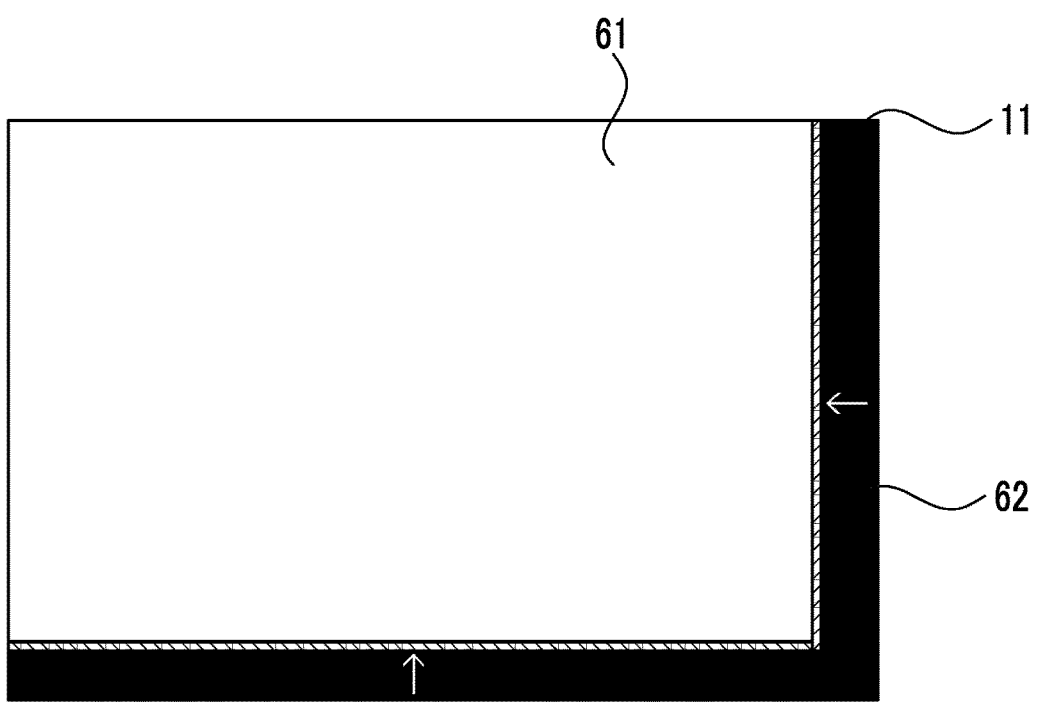
FIG. 11 is a diagram illustrating another example of the highlighted display in the electronic shifting by the projection apparatus 10.

FIG. 11 is a diagram illustrating another example of the highlighted display in the electronic shifting by the projection apparatus 10. In performing the electronic shifting illustrated in FIG. 6, for example, the projection apparatus 10 may receive the shift operation of moving the projection range 11 in an oblique direction such as upper left, lower left, upper right, and lower right directions.

For example, it is assumed that the projection apparatus 10 receives the shift operation of providing an instruction to move the projection range 11 in the upper left direction. In this case, as illustrated in FIG. 11, the projection apparatus 10 may perform the highlighted display of the right end part and the lower end part of the adjustment image 61 of which the display positions change in response to the shift operation in the adjustment image 61.

Highlighted Display in Electronic Enlargement or Reduction by Projection Apparatus 10

Figure 12:
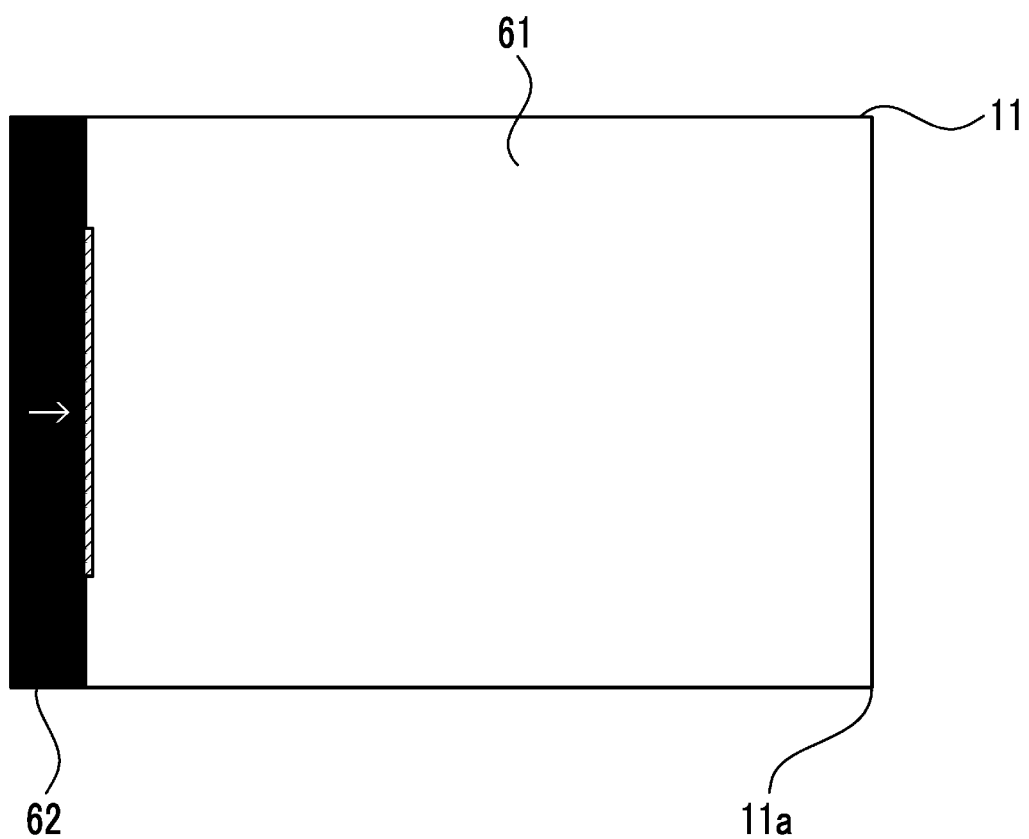
FIG. 12 is a diagram illustrating an example of highlighted display in the electronic enlargement or reduction by the projection apparatus 10.

FIG. 12 is a diagram illustrating an example of highlighted display in the electronic enlargement or reduction by the projection apparatus 10. Even in performing the electronic enlargement or reduction illustrated in FIG. 8, the projection apparatus 10 may perform the highlighted display of the end part of the adjustment image 61 of which the display position changes in response to the enlargement or reduction operation.

In the example illustrated in FIG. 12, it is assumed that the enlargement or reduction operation of providing the instruction to reduce the width of the display region of the projection range 11 is performed as in the example illustrated in FIG. 8. In this case, as illustrated in FIG. 12, the projection apparatus 10 may perform the highlighted display of the left end part of the adjustment image 61 of which the display position changes in response to the enlargement or reduction operation in the adjustment image 61.

In addition, the highlighted display in the electronic enlargement or reduction may be performed in a different aspect from the highlighted display in the electronic shifting. For example, in the highlighted display in the electronic enlargement or reduction illustrated in FIG. 12, only a part of the left end part of the adjustment image 61 is subjected to the highlighted display unlike the highlighted display in the electronic shifting illustrated in FIG. 9 to FIG. 11.

Resolution of Each of Electronic Shifting and Optical System Shifting

Here, resolution of each of the electronic shifting and the optical system shifting will be described. For example, the electronic shifting corresponding to the shift operation can be performed with resolution of a pixel unit of the light modulation portion 22. On the other hand, the optical system shifting accompanies mechanical driving of the projection optical system 23. Thus, resolution of the optical system shifting may be greater than the pixel unit of the light modulation portion 22.

The projection apparatus 10 performs movement of the projection range 11 by the optical system shifting by controlling a drive mechanism of the projection optical system 23 based on correspondence information between a displacement amount in the shift operation and a displacement amount of the drive mechanism (for example, the shift mechanism 105) of the projection optical system 23.

The displacement amount in the shift operation is a movement amount (pitch) of the adjustment image 61 per unit in the electronic shifting corresponding to the shift operation. The displacement amount of the drive mechanism of the projection optical system 23 is the movement amount of the projection range 11 per unit in the optical system shifting performed by driving the projection optical system 23.

As an example, in the electronic shifting corresponding to the shift operation, the movement amount of the adjustment image 61 per unit is 1 pixel. On the other hand, in the optical system shifting, the movement amount of the projection range 11 per unit is 4 pixels. Correspondence information (1 unit of optical system shifting=1 unit of electronic shifting× 4) indicating this relationship is set in advance in the projection apparatus 10.

In this case, the projection apparatus 10 derives a driving amount of the projection optical system 23 for moving the projection range 11 by the movement amount of the adjustment image 61 corresponding to the received shift operation from the correspondence information. By driving the projection optical system 23 by the derived driving amount, the projection apparatus 10 can move the projection range 11 by the movement amount of the adjustment image 61 corresponding to the received shift operation.

For example, in a case where the position decision operation is received after the shift operation of providing an instruction to move the projection range 11 leftward by 8 units (for example, 8 pixels) is received, the projection apparatus 10 can move the projection range 11 by the movement amount of the adjustment image 61 corresponding to the received shift operation by driving the drive mechanism of the projection optical system 23 by 2 units based on the correspondence information (1 unit of optical system shifting=1 unit of electronic shifting×4).

Figure 13:
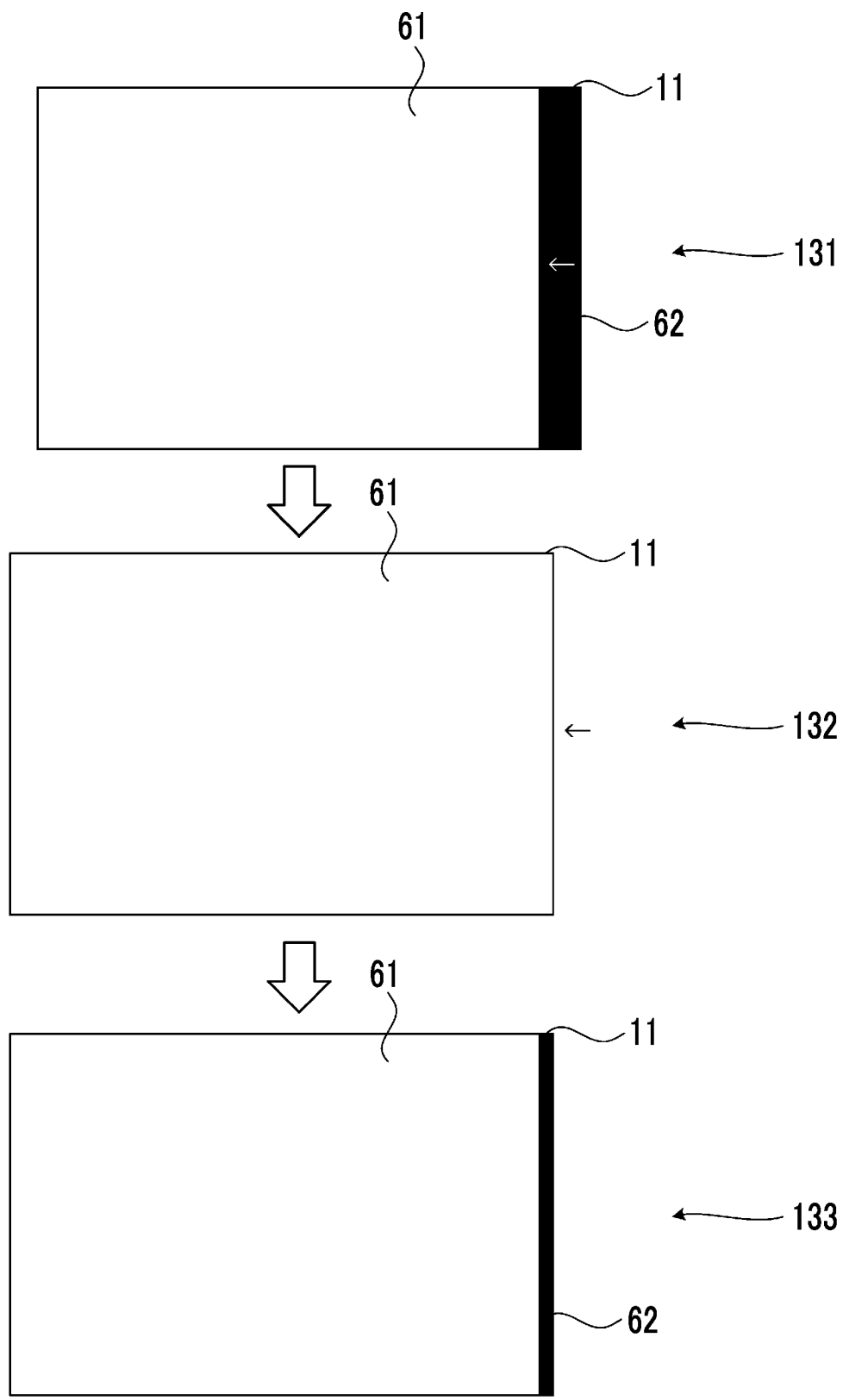
FIG. 13 is a diagram illustrating an example of adjustment of the projection range 11 in which resolution of each of the electronic shifting and the optical system shifting is considered.

Adjustment of Projection Range 11 in Which Resolution of Each of Electronic Shifting and Optical System Shifting Is Considered FIG. 13 is a diagram illustrating an example of adjustment of the projection range 11 in which the resolution of each of the electronic shifting and the optical system shifting is considered.

As described above, the resolution of the optical system shifting may be greater than the pixel unit of the light modulation portion 22. In such a case, the projection range 11 may not be movable by the movement amount of the adjustment image 61 corresponding to the shift operation by only the optical system shifting.

For example, in steps S52 to S54 in FIG. 5, it is assumed that electronic shifting 131 illustrated in FIG. 13 is performed. In performing the optical system shifting based on a result of the electronic shifting 131, it is assumed that performing the optical system shifting by N units results in an insufficient displacement amount of the projection range 11 with respect to the result of the electronic shifting 131, and performing the optical system shifting by N+1 units results in an excessively large displacement amount of the projection range 11 with respect to the result of the electronic shifting 131. N is a natural number greater than or equal to 0.

In this case, in step S55 in FIG. 5, for example, the projection apparatus 10 performs optical system shifting 132 by N units and further performs electronic shifting 133 of reducing the adjustment image 61 by an insufficient amount of the displacement amount of the projection range 11 with respect to the electronic shifting 131. Then, the projection apparatus 10 transitions to step S56.

The projection apparatus 10 performs the movement (optical system shifting) of the projection range 11 by the drive mechanism of the projection optical system 23 and changing of the display region of the adjustment image 61 within the projection range 11 in combination in response to the position decision operation after the shift operation. Accordingly, even in a case where the projection range 11 cannot be moved by the movement amount of the adjustment image 61 corresponding to the shift operation by only the optical system shifting, an end part of the display region of the projection range 11 can be moved to a position intended by the user.

Alternatively, the projection apparatus 10 may perform a control of setting the movement amount of the adjustment image 61 per unit in the electronic shifting corresponding to the shift operation to the movement amount of the projection range 11 per unit in the optical system shifting. For example, the projection apparatus 10 may perform the electronic shifting of moving the adjustment image 61 by 4 pixels of the light modulation portion 22 each time the shift operation by 1 unit is received.

In a case where the resolution of the optical system shifting is less than or equal to the pixel unit of the light modulation portion 22, the projection range 11 can be moved by the movement amount of the adjustment image 61 corresponding to the shift operation by the optical system shifting without particular restrictions.

Figure 14:
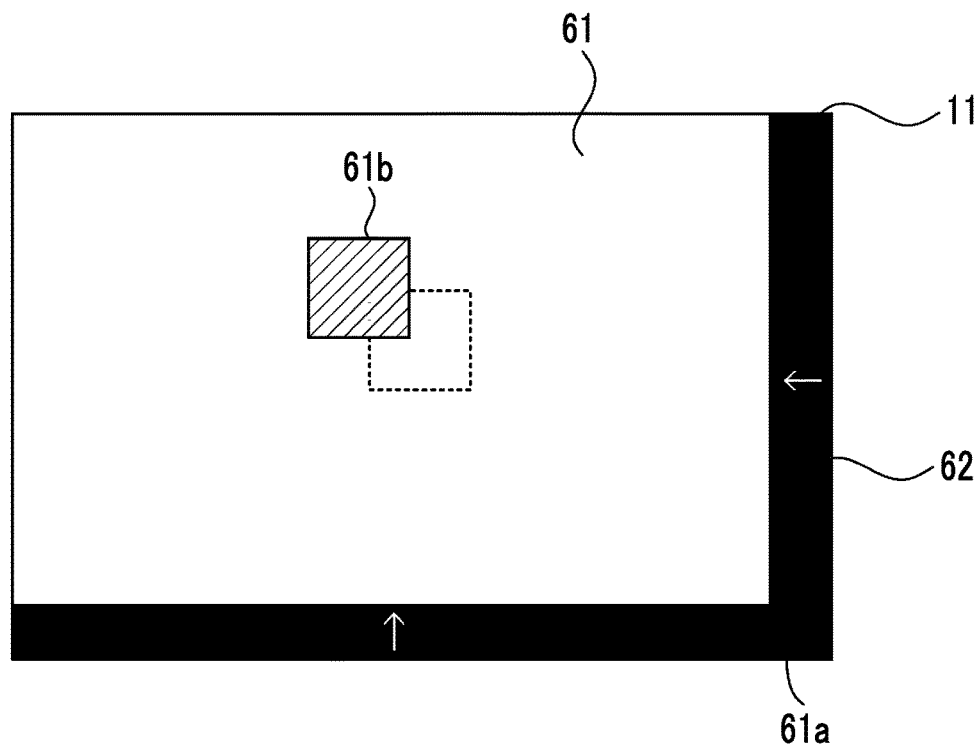
FIG. 14 is a diagram (Part 1) illustrating a specific example of the electronic shifting by the projection apparatus 10.
Figure 15:
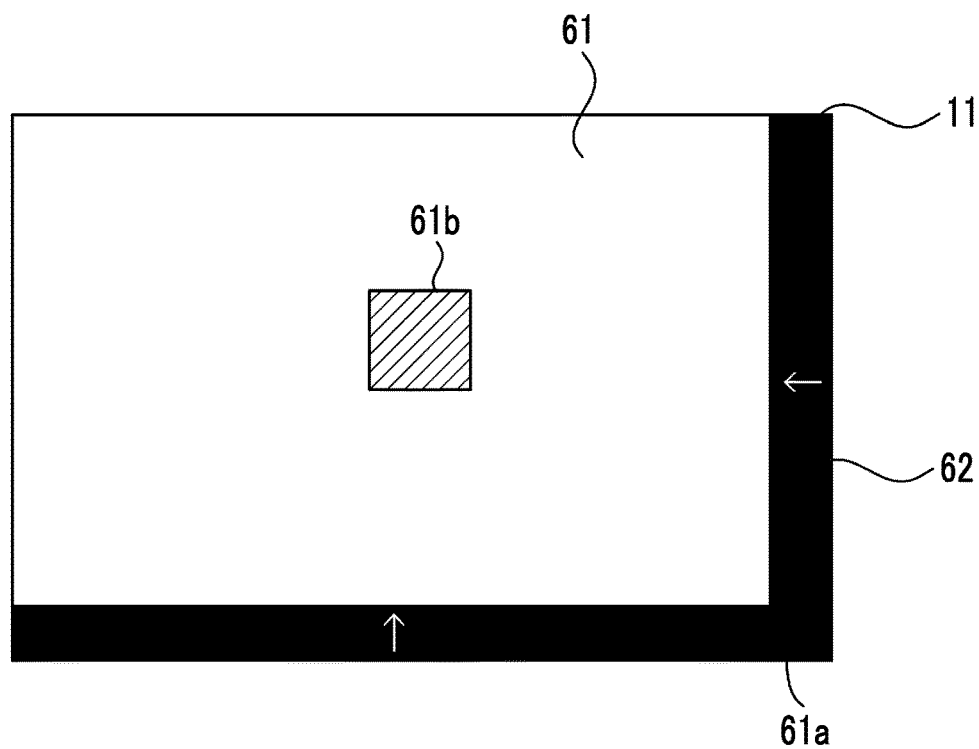
FIG. 15 is a diagram (Part 2) illustrating a specific example of the electronic shifting by the projection apparatus 10.

FIG. 14 and FIG. 15 are diagrams illustrating specific examples of the electronic shifting by the projection apparatus 10. Examples of a method of moving the end part of the adjustment image 61 in the electronic shifting include a shift method illustrated in FIG. 14 and a trimming method illustrated in FIG. 15.

A FIG. 61b is a figure included near a center of the adjustment image 61.

Here, it is assumed that the shift operation of providing the instruction to move the projection range 11 in the upper left direction is performed as in the example illustrated in FIG. 6.

In the electronic shifting of the shift method illustrated in FIG. 14, the projection apparatus 10 moves the entire adjustment image 61 in the upper left direction and moves the end part (lower right corner 61a) of the adjustment image 61 such that a part (in the example in FIG. 14, the left end part and the upper end part) of the adjustment image 61 extending from the projection range 11 is not displayed. In this case, the FIG. 61b moves in the upper left direction as illustrated in FIG. 14.

In the electronic shifting of the trimming method illustrated in FIG. 15, the projection apparatus 10 does not move the adjustment image 61 and moves the end part (lower right corner 61a) of the adjustment image 61 such that an end part (in the example in FIG. 15, the end part as the right end part) of the adjustment image 61 on the opposite side to a movement direction is not displayed. In this case, the FIG. 61b does not move as illustrated in FIG. 15.

In addition, the projection apparatus 10 may switch between the shift method and the trimming method in response to a user operation performed on the operation reception portion 2.

Optical System Shifting Following Electronic Shifting by Projection Apparatus 10

FIG. 16 to FIG. 19 are diagrams illustrating an example of the optical system shifting following the electronic shifting by the projection apparatus 10. In step S53 in FIG. 5, the projection apparatus 10 may perform the electronic shifting and also the optical system shifting following the electronic shifting.

An optical system shifting range 161 is a range within which the projection range 11 can be moved by the optical system shifting. The optical system shifting range 161 is set in advance in the projection apparatus 10 based on restrictions on the drive mechanism of the projection optical system 23, distortion of the projection image caused by the optical system shifting, and the like.

Figure 16:
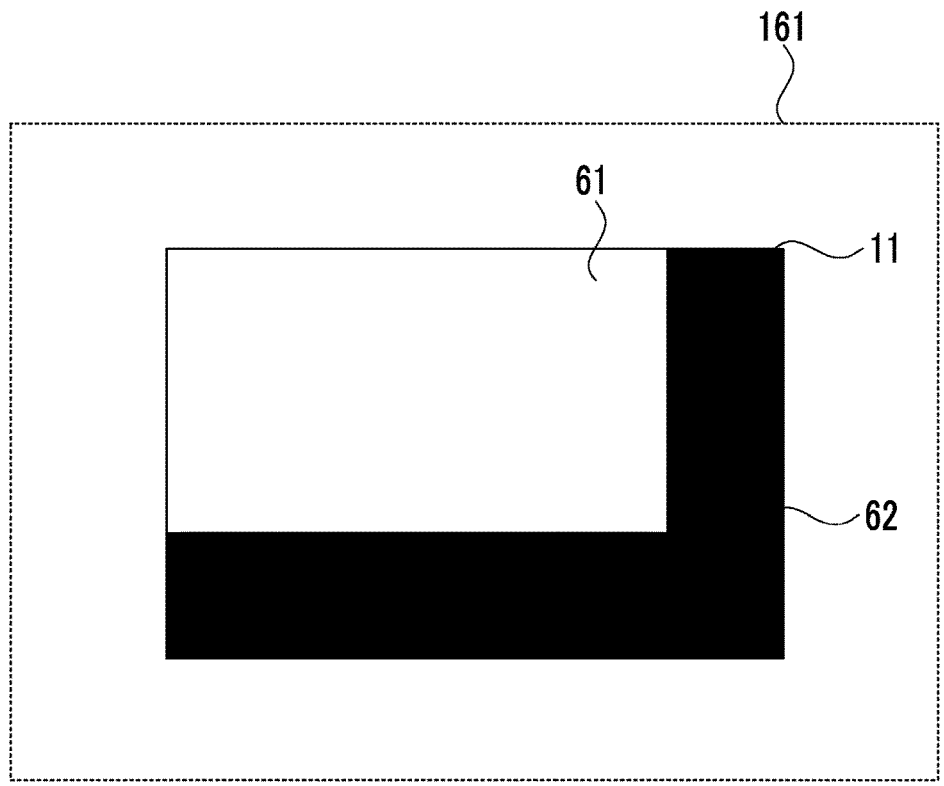
FIG. 16 is a diagram (Part 1) illustrating an example of the optical system shifting following the electronic shifting by the projection apparatus 10.

In the state illustrated in FIG. 16, the lower right corner 61a of the adjustment image 61 can be moved upward, downward, leftward, and rightward by the shift operation as in the state illustrated in FIG. 6.

Figure 17:
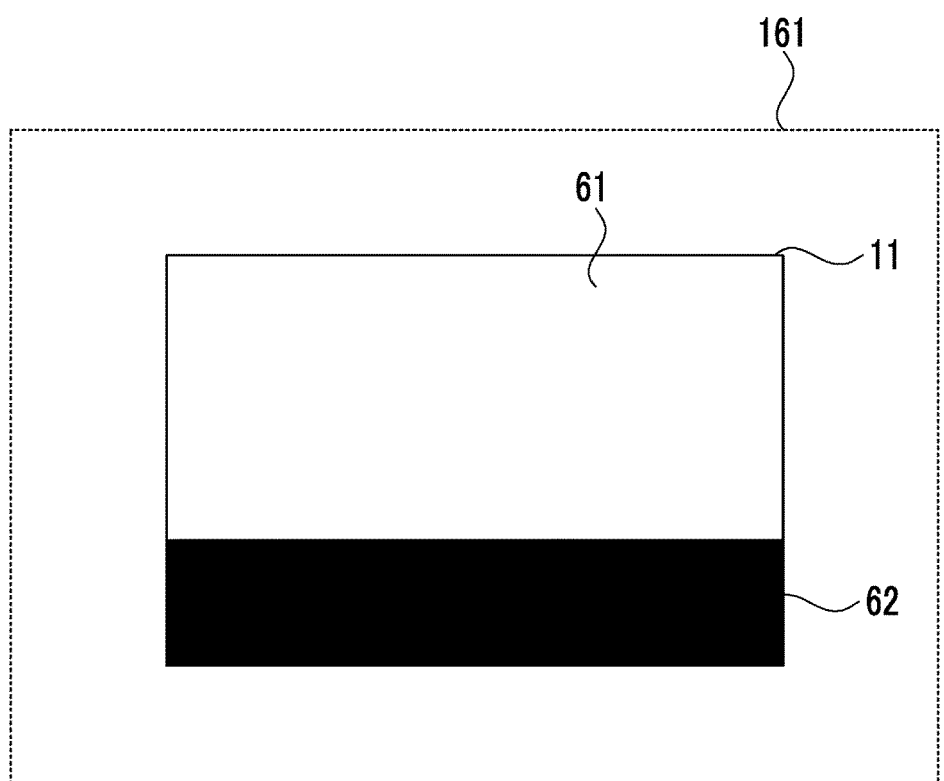
FIG. 17 is a diagram (Part 2) illustrating an example of the optical system shifting following the electronic shifting by the projection apparatus 10.

It is assumed that the shift operation of providing the instruction to move the projection range 11 rightward is performed from the state illustrated in FIG. 16, and the right end part of the adjustment image 61 reaches a right end part of the projection range 11 as illustrated in FIG. 17.

The right end part of the adjustment image 61 cannot be further moved rightward in the state illustrated in FIG. 17. In this state, in a case where the shift operation of providing the instruction to move the projection range 11 rightward is further performed, the projection apparatus 10 moves the projection range 11 rightward by the optical system shifting in response to the shift operation as illustrated in FIG. 18.

In a case where a display position of a part of the end part (for example, the right end part) of the adjustment image 61 that is changed by the shift operation exceeds the projection range 11, the projection apparatus 10 moves the projection range 11 by the optical system shifting for controlling the drive mechanism of the projection optical system 23. Accordingly, a variable range of the part of the end part (for example, the right end part) of the adjustment image 61 can be increased, and the registration of the projection range 11 can be more flexibly performed.

Figure 18:
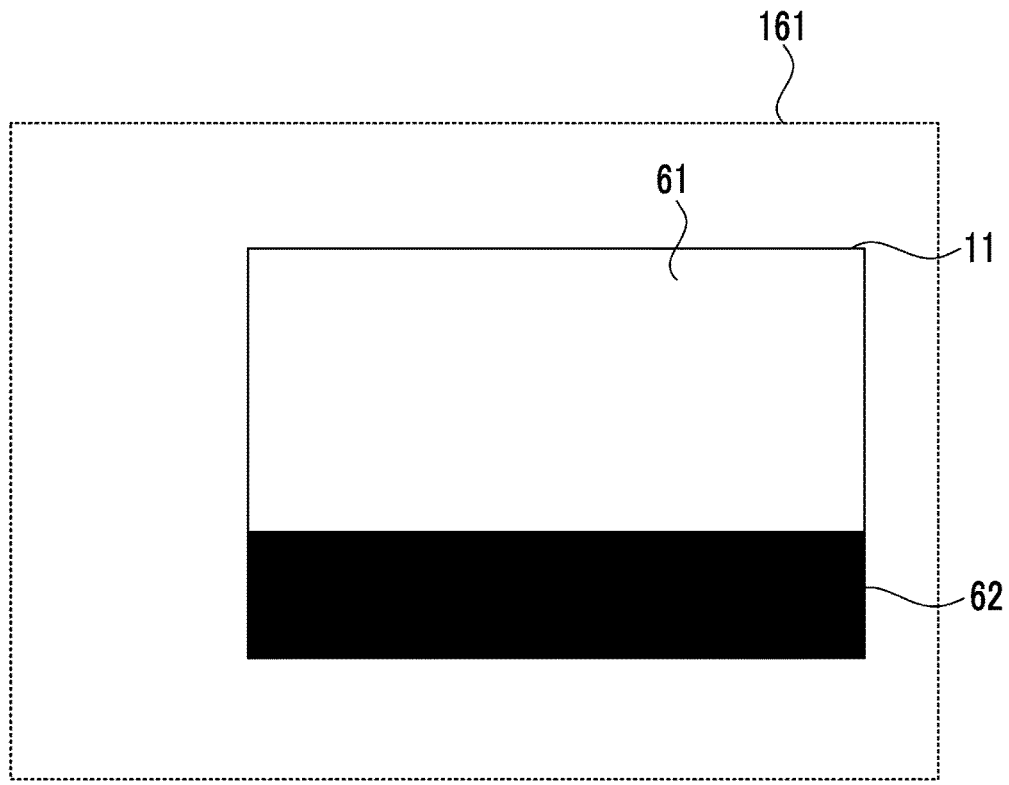
FIG. 18 is a diagram (Part 3) illustrating an example of the optical system shifting following the electronic shifting by the projection apparatus 10.
Figure 19:
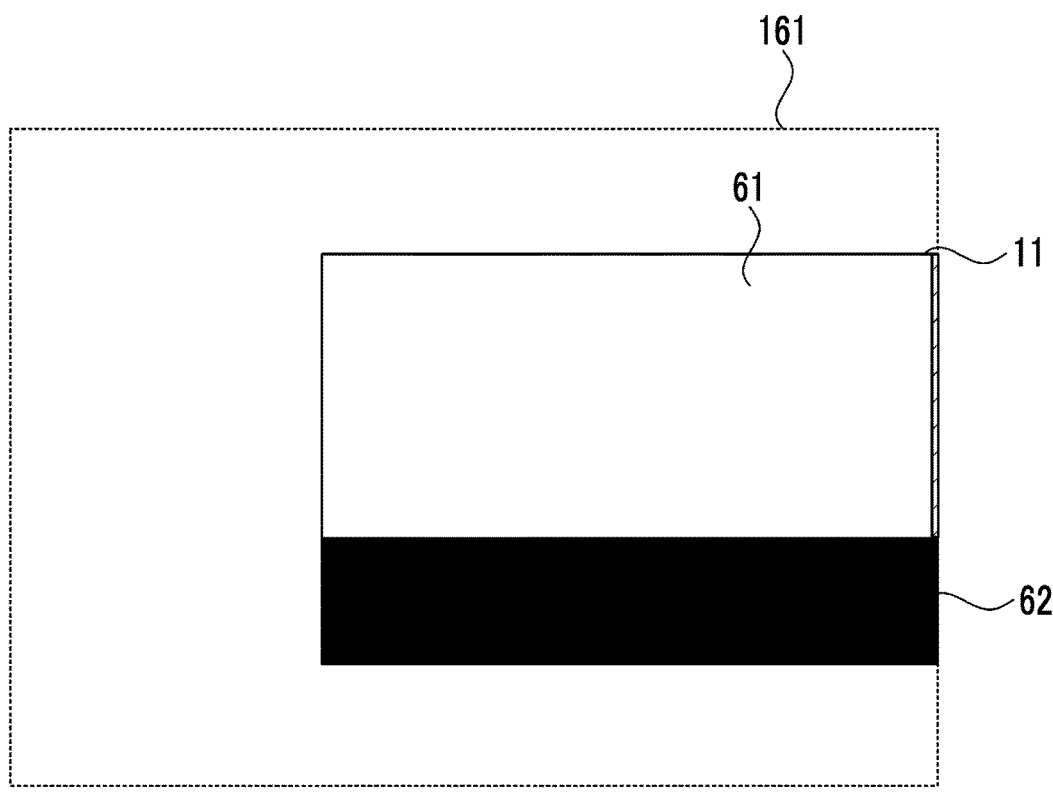
FIG. 19 is a diagram (Part 4) illustrating an example of the optical system shifting following the electronic shifting by the projection apparatus 10.

It is assumed that the shift operation of providing the instruction to move the projection range 11 rightward is further performed in the state illustrated in FIG. 18, and the right end part of the projection range 11 reaches a right end part of the optical system shifting range 161 as illustrated in FIG. 19.

The right end part of the projection range 11 cannot be further moved rightward in the state illustrated in FIG. 19. Thus, the projection apparatus 10 notifies the user that the right end part of the adjustment image 61 (projection range 11) cannot be further moved rightward. In the example illustrated in FIG. 19, the projection apparatus 10 performs this notification by performing the highlighted display of the right end part of the adjustment image 61.

The highlighted display illustrated in FIG. 19 can be various types of highlighted display in the same manner as the highlighted display described using FIG. 9 to FIG. 12. In a case of performing the highlighted display illustrated in FIG. 19 together with the highlighted display described using FIG. 9 to FIG. 12, the highlighted display illustrated in FIG. 19 may be performed in a different aspect from the highlighted display described using FIG. 9 to FIG. 12.

The projection apparatus 10 notifies the user in a case where the movement destination of the projection range 11 corresponding to the shift operation exceeds the optical system shifting range 161 within which the projection range 11 can move. Accordingly, the user can easily perceive that the optical system shifting cannot be further performed, and handle this situation by, for example, changing a position or a direction of installation of the projection apparatus 10.

Figure 20:
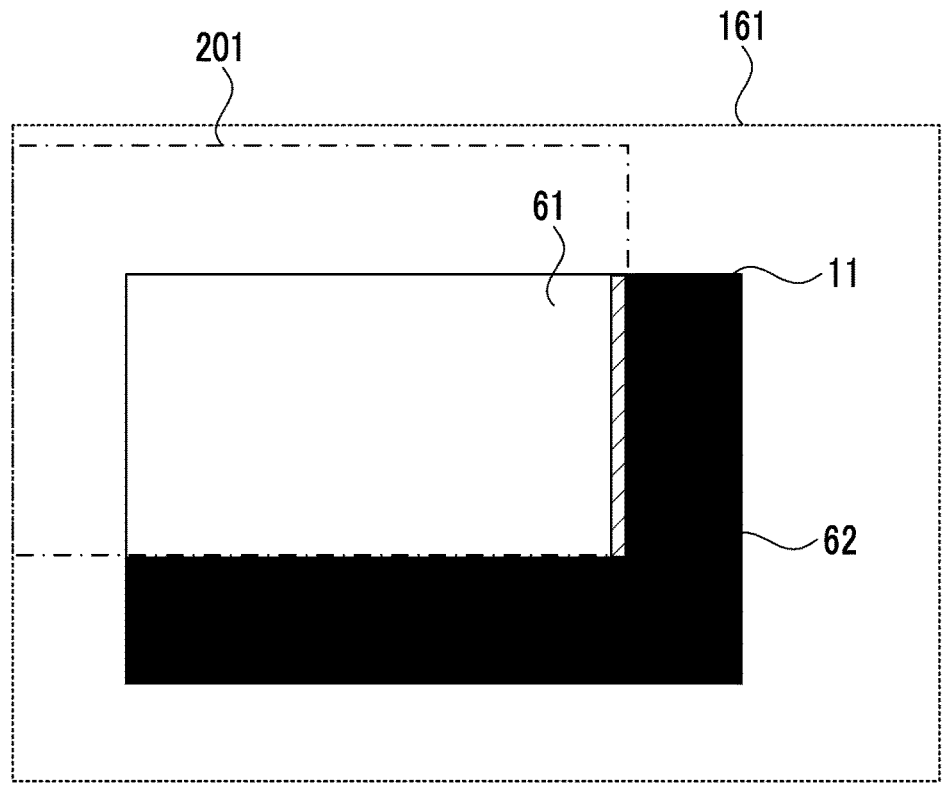
FIG. 20 is a diagram (Part 1) illustrating another example of notification of a limit of the shifting by the projection apparatus 10.
Figure 21:
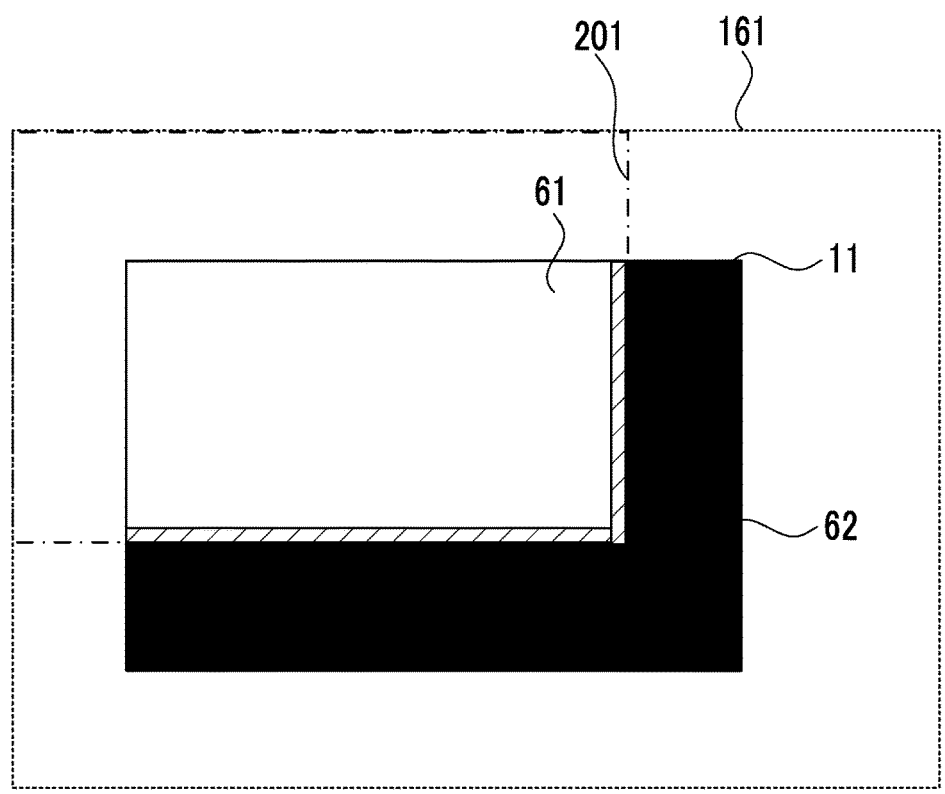
FIG. 21 is a diagram (Part 2) illustrating another example of the notification of the limit of the shifting by the projection apparatus 10.

FIG. 20 and FIG. 21 are diagrams illustrating other examples of notification of a limit of the shifting by the projection apparatus 10. A virtual projection range 201 illustrated in FIG. 20 virtually illustrates the entire region of the projection range 11 after the optical system shifting shown by the adjustment image 61. The adjustment image 61 shows a part of the virtual projection range 201 included in the projection range 11 at the current point in time.

In the state illustrated in FIG. 20, it can be predicted that even in a case where the projection range 11 after the optical system shifting shown by the adjustment image 61 is moved leftward, the optical system shifting corresponding to the adjustment image 61 cannot be performed in step S55 in FIG. 5 because a left end part of the virtual projection range 201 has reached a left end part of the optical system shifting range 161.

Thus, the projection apparatus 10 notifies the user that the shifting cannot be further performed leftward. In the example illustrated in FIG. 20, the projection apparatus 10 performs this notification by performing the highlighted display of the right end part of the adjustment image 61. Alternatively, the projection apparatus 10 may perform this notification by performing the highlighted display (not illustrated) of the left end part of the adjustment image 61.

Similarly, in the state illustrated in FIG. 21, it can be predicted that even in a case where the projection range 11 after the optical system shifting shown by the adjustment image 61 is moved leftward or upward, the optical system shifting corresponding to the adjustment image 61 cannot be performed in step S55 in FIG. 5 because an upper left corner of the virtual projection range 201 has reached an upper left corner of the optical system shifting range 161.

Thus, the projection apparatus 10 notifies the user that the shifting cannot be further performed leftward or upward. In the example illustrated in FIG. 21, the projection apparatus 10 performs this notification by performing the highlighted display of the right end part and the lower end part of the adjustment image 61. Alternatively, the projection apparatus 10 may perform this notification by performing the highlighted display (not illustrated) of the left end part and the upper end part of the adjustment image 61.

The highlighted display illustrated in FIG. 20 and FIG. 21 can be various types of highlighted display in the same manner as the highlighted display described using FIG. 9 to FIG. 12 and FIG. 19. In a case of performing the highlighted display illustrated in FIG. 20 and FIG. 21 together with the highlighted display described using FIG. 9 to FIG. 12 and FIG. 19, the highlighted display illustrated in FIG. 20 and FIG. 21 may be performed in a different aspect from the highlighted display described using FIG. 9 to FIG. 12 and FIG. 19.

Modification Example of Present Embodiment

For example, in a case where the shift operation is the operation of tilting the joystick, the projection apparatus 10 may start the processing illustrated in FIG. 5 in a case where a touch of the user on the joystick is sensed. Accordingly, in a case where the user touches the joystick, the adjustment image is automatically displayed by the projection apparatus 10, and the user can continuously perform the electronic shifting by performing the operation of tilting the joystick.

While the press on the decision key or the like is described as an example of the position decision operation of providing the instruction to perform the optical system shifting, the position decision operation may be performed by, for example, not performing the shift operation for a constant time period or longer. Accordingly, the user can cause the projection apparatus 10 to execute the optical system shifting by not performing the shift operation for the constant time period after causing the projection apparatus 10 to execute the electronic shifting by performing the shift operation. Similarly, for example, the size decision operation may be performed by not performing the enlargement or reduction operation for a constant time period or longer. This constant time period is generally a time period longer than an interval of the shift operation in the adjustment performed by the user and, as an example, can be set to approximately 5 seconds.

In addition, for example, this constant time period may be set to a short time period such as approximately 1 second. In this case, the projection apparatus 10 performs the optical system shifting following the shift operation with a delay of approximately 1 second.

At least the following matters are disclosed in the present specification.

(1) A projection apparatus including a projection portion that performs irradiation with projection light, a moving mechanism that moves a projection range of the projection light, and a processor, in which the processor is configured to, in response to a first operation, display an image showing a movement destination of the projection range by the projection portion in a state where the projection range is maintained, and execute a control of moving the projection range to the movement destination by the moving mechanism.

(2) The projection apparatus according to (1), in which the processor is configured to, in a state where the projection range is maintained, display an image showing the projection range by the projection portion, and execute a control of moving the projection range in accordance with the image by the moving mechanism.

(3) The projection apparatus according to (1) or (2), in which the processor is configured to execute a control of moving the projection range to the movement destination in response to a second operation.

(4) The projection apparatus according to any one of (1) to (3), in which the processor is configured to display the image within the projection range and, in a state where the projection range is maintained, execute a control of changing a display position of a part of an end part of the image by reducing a region of the image within the projection range in response to the first operation.

(5) The projection apparatus according to (4), in which the processor is configured to execute a control of moving the projection range in response to a second operation such that an end part of the projection range matches the changed display position of the part of the end part.

(6) The projection apparatus according to (4) or (5), in which the processor is configured to, in a state where the first operation is received, execute a control of performing highlighted display of the part of the end part of which the display position changes in response to the first operation in the end part of the image.

(7) The projection apparatus according to any one of (4) to (6), in which the processor is configured to move the projection range and execute a control of changing a size of the image in response to a third operation in a state where the projection range is maintained.

(8) The projection apparatus according to (7), in which the processor is configured to, in a state where the third operation is received, execute a control of performing highlighted display of the end part of the image of which the display position changes in response to the third operation.

(9) The projection apparatus according to any one of (1) to (8), in which the processor is configured to execute a control of moving the projection range by controlling the moving mechanism based on correspondence information between a displacement amount in the first operation and a displacement amount of the moving mechanism.

(10) The projection apparatus according to (9), in which in a case where the displacement amount in the first operation and the displacement amount of the moving mechanism are different, the processor is configured to execute a control of moving of the projection range by the moving mechanism and changing of a display region of the image within the projection range in combination in response to a second operation.

(11) The projection apparatus according to any one of (1) to (10), in which the processor is configured to execute a control of performing notification in a case where the movement destination of the projection range corresponding to the first operation exceeds a range within which the projection range is movable.

(12) The projection apparatus according to any one of (4) to (8), in which the processor is configured to, in a case where the display position of the part of the end part that changes by the first operation exceeds the projection range, execute a control of moving the projection range by controlling the moving mechanism.

(13) A projection method by a projection apparatus including a projection portion that performs irradiation with projection light, and a moving mechanism that moves a projection range of the projection light, the projection method including displaying, in response to a first operation, an image showing a movement destination of the projection range by the projection portion in a state where the projection range is maintained, and moving the projection range to the movement destination by the moving mechanism.

(14) The projection method according to (13), in which in a state where the projection range is maintained, an image showing the projection range is displayed by the projection portion, and the projection range is moved in accordance with the image by the moving mechanism.

(15) The projection method according to (13) or (14), in which the projection range is moved to the movement destination in response to a second operation.

(16) The projection method according to any one of (13) to (15), in which the image is displayed within the projection range, and in a state where the projection range is maintained, a display position of a part of an end part of the image is changed by reducing a region of the image within the projection range in response to the first operation.

(17) The projection method according to (16), in which the projection range is moved in response to a second operation such that an end part of the projection range matches the changed display position of the part of the end part.

(18) The projection method according to (16) or (17), in which in a state where the first operation is received, highlighted display of the part of the end part of which the display position changes in response to the first operation in the end part of the image is performed.

(19) The projection method according to any one of (16) to (18), in which the projection range is moved, and a size of the image is changed in response to a third operation in a state where the projection range is maintained.

(20) The projection method according to (19), in which in a state where the third operation is received, highlighted display of the end part of the image of which the display position changes in response to the third operation is performed.

(21) The projection method according to any one of (13) to (20), in which the projection range is moved by controlling the moving mechanism based on correspondence information between a displacement amount in the first operation and a displacement amount of the moving mechanism.

(22) The projection method according to (21), in which in a case where the displacement amount in the first operation and the displacement amount of the moving mechanism are different, moving of the projection range by the moving mechanism and changing of a display region of the image within the projection range are performed in combination in response to a second operation.

(23) The projection method according to any one of (13) to (22), in which notification is performed in a case where the movement destination of the projection range corresponding to the first operation exceeds a range within which the projection range is movable.

(24) The projection method according to any one of (16) to (20), in which in a case where the display position of the part of the end part that changes by the first operation exceeds the projection range, the projection range is moved by controlling the moving mechanism.

(25) A non-transitory computer readable medium storing a control program of a projection apparatus including a projection portion that performs irradiation with projection light, and a moving mechanism that moves a projection range of the projection light, the control program causing a computer to execute a process including displaying, in response to a first operation, an image showing a movement destination of the projection range by the projection portion in a state where the projection range is maintained, and executing a control of moving the projection range to the movement destination by the moving mechanism.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2020-012987) filed on Jan. 29, 2020, the content of which is incorporated in the present application by reference.

EXPLANATION OF REFERENCES

1: projection portion
2: operation reception portion
2A, 3A: hollow portion
2a, 2b, 3a, 3c, 15a: opening
4: control device
4a: storage medium
6: screen
10: projection apparatus
11: projection range
11a, 61a: lower right corner
12: light modulation unit
15: housing
21: light source
22: light modulation portion
23: projection optical system
31: second optical system
32: reflective member
33: third optical system
34: lens
61: adjustment image
61b: figure
62: blank image
101: body part
102: first member
103: second member
104: imaging direction changing mechanism
105: shift mechanism
106: optical unit
121: first optical system
122: reflective member
131, 133: electronic shifting
132: optical system shifting
161: optical system shifting range
201: virtual projection range
G1: image

What is claimed is:

1. A projection apparatus comprising:
a projection portion that performs irradiation with projection light;
a moving mechanism that moves a projection range of the projection light; and
a processor,
wherein the processor is configured to,
in response to a first operation, display an image showing a movement destination of the projection range by the projection portion in a state where the projection range is maintained,
execute a control of moving the projection range to the movement destination by the moving mechanism,
execute a control of moving the projection range by controlling the moving mechanism based on correspondence information between a displacement amount in the first operation and a displacement amount of the moving mechanism, and
wherein in a case where the displacement amount in the first operation and the displacement amount of the moving mechanism are different, the processor is configured to execute a control of moving of the projection range by the moving mechanism and changing of a display region of the image within the projection range in combination in response to a second operation.

2. The projection apparatus according to claim 1, wherein the processor is configured to,
display an image showing the projection range by the projection portion in a state where the projection range is maintained, and
execute a control of moving the projection range by the moving mechanism in accordance with the image.

3. The projection apparatus according to claim 1, wherein the processor is configured to execute a control of moving the projection range to the movement destination in response to a second operation.

4. The projection apparatus according to claim 1, wherein the processor is configured to execute a control of performing notification in a case where the movement destination of the projection range corresponding to the first operation exceeds a range within which the projection range is movable.

5. A projection method by a projection apparatus including a projection portion that performs irradiation with projection light, and a moving mechanism that moves a projection range of the projection light, the projection method comprising:
displaying, in response to a first operation, an image showing a movement destination of the projection range by the projection portion in a state where the projection range is maintained; and
moving the projection range to the movement destination by the moving mechanism,
wherein the projection range is moved by controlling the moving mechanism based on correspondence information between a displacement amount in the first operation and a displacement amount of the moving mechanism, and
wherein in a case where the displacement amount in the first operation and the displacement amount of the moving mechanism are different, moving of the projection range by the moving mechanism and changing of a display region of the image within the projection range are performed in combination in response to a second operation.

6. The projection method according to claim 5,
wherein an image showing the projection range is displayed by the projection portion in a state where the projection range is maintained, and
the projection range is moved in accordance with the image by the moving mechanism.

7. The projection method according to claim 5,
wherein the projection range is moved to the movement destination in response to a second operation.

8. The projection method according to claim 5,
wherein notification is performed in a case where the movement destination of the projection range corresponding to the first operation exceeds a range within which the projection range is movable.

9. A non-transitory computer readable medium storing a control program of a projection apparatus including a projection portion that performs irradiation with projection light, and a moving mechanism that moves a projection range of the projection light, the control program causing a computer to execute a process comprising:
displaying, in response to a first operation, an image showing a movement destination of the projection range by the projection portion in a state where the projection range is maintained; and
executing a control of moving the projection range to the movement destination by the moving mechanism,
wherein the projection range is moved by controlling the moving mechanism based on correspondence information between a displacement amount in the first operation and a displacement amount of the moving mechanism, and
wherein in a case where the displacement amount in the first operation and the displacement amount of the moving mechanism are different, moving of the projection range by the moving mechanism and changing of a display region of the image within the projection range are performed in combination in response to a second operation.

* * * * *